United States Patent [19]

Robbins, III

[11] Patent Number: 5,711,445

[45] Date of Patent: Jan. 27, 1998

[54] COLLAPSIBLE URINE CONTAINER

[76] Inventor: Edward S. Robbins, III, 2802 E. Avalon Ave., Muscle Shoals, Ala. 35661

[21] Appl. No.: 243,108

[22] Filed: May 16, 1994

Related U.S. Application Data

[63] Continuation-in-part of Ser. No. 47,185, Apr. 16, 1993, Pat. No. 5,417,337, which is a continuation-in-part of Ser. No. 12,122, Feb. 1, 1993, abandoned, which is a continuation-in-part of Ser. No. 789,838, Nov. 12, 1991, Pat. No. 5,226,551.

[51] Int. Cl.$^6$ ........................................ B65D 6/12
[52] U.S. Cl. ........................... 220/8; 220/666; 215/384; 215/398; 215/900; 222/143; 222/382; 222/529; 222/530; 4/144.1; 4/144.3
[58] Field of Search .................. 220/8, 666; 215/900, 215/382, 383, 384, 398; 222/143, 382, 383, 385, 464, 527, 529, 530; 4/144.1, 144.3

[56] References Cited

U.S. PATENT DOCUMENTS

| | | | |
|---|---|---|---|
| D. 190,837 | 7/1961 | Johnson | 215/398 X |
| 1,048,935 | 12/1912 | Brady . | |
| 1,791,787 | 2/1931 | Barroll | 215/398 X |
| 2,784,882 | 3/1957 | Du Bois . | |
| 2,880,902 | 4/1959 | Owsen . | |
| 2,899,110 | 8/1959 | Parker . | |
| 2,985,915 | 5/1961 | Winstead . | |
| 3,066,819 | 12/1962 | Cox | 215/398 X |
| 3,143,429 | 8/1964 | Swanson et al. . | |
| 3,156,383 | 11/1964 | Melli . | |
| 3,220,544 | 11/1965 | Lovell . | |
| 3,301,293 | 1/1967 | Santelli . | |
| 3,343,698 | 9/1967 | Anderson et al. | 215/398 |
| 3,397,724 | 8/1968 | Bolen et al. | 215/398 |
| 3,467,283 | 9/1969 | Kinnavy . | |
| 3,494,509 | 2/1970 | McGuire . | |
| 3,608,268 | 9/1971 | Lauritzen . | |
| 3,707,241 | 12/1972 | Taylor . | |
| 3,716,871 | 2/1973 | Borse | 215/398 X |
| 3,864,771 | 2/1975 | Bauer et al. . | |
| 3,875,941 | 4/1975 | Adair . | |
| 3,939,888 | 2/1976 | Scarnato . | |
| 4,087,024 | 5/1978 | Martin et al. . | |
| 4,428,507 | 1/1984 | Sneider . | |
| 4,456,134 | 6/1984 | Cooper . | |
| 4,492,313 | 1/1985 | Touzani . | |
| 4,706,829 | 11/1987 | Li . | |
| 4,712,699 | 12/1987 | Lutz . | |

(List continued on next page.)

FOREIGN PATENT DOCUMENTS

| | | |
|---|---|---|
| 587701 | 8/1924 | France . |
| 1 301 970 | 8/1969 | Germany . |
| 2 340 967 | 3/1974 | Germany . |
| 3937-456-A | 5/1991 | Germany . |
| 4-102544(A) | 4/1992 | Japan . |
| 2 109 247 | 6/1983 | United Kingdom . |
| 2 138 525 | 10/1984 | United Kingdom . |
| WO 88/05014 | 7/1988 | WIPO . |

*Primary Examiner*—Stephen Cronin
*Attorney, Agent, or Firm*—Nixon & Vanderhye P.C.

[57] ABSTRACT

A reusable, collapsible urine container includes a bottom wall and a relatively flexible, peripheral side wall extending upwardly from the bottom wall. The peripheral side wall includes upper, intermediate and lower concentric portions and an uppermost inclined or non-concentric portion extending upwardly and angularly from the upper concentric portion. The intermediate concentric portion has a wall thickness less than the upper and lower concentric portions, such that the peripheral side wall movable between axially extended and collapsed positions, wherein, in the collapsed position, the lower concentric side wall portion is partially telescoped within the upper concentric side wall portion with the intermediate concentric portion reverse folded therebetween. The uppermost or non-concentric portion is formed with an annular rim defining an upper open end of the container, the rim adapted to receive a removable cap. A handle is integrally formed in the peripheral side wall. The uppermost inclined or non-concentric portion may be collapsible into the upper concentric side wall portion, or rigidly formed therewith.

16 Claims, 5 Drawing Sheets

U.S. PATENT DOCUMENTS

| | | | |
|---|---|---|---|
| 4,736,920 | 4/1988 | Omessi | 215/398 X |
| 4,759,454 | 7/1988 | Nowicki et al. | 215/398 X |
| 4,775,564 | 10/1988 | Shriver et al. | |
| 4,815,615 | 3/1989 | Phlaphongphanich | |
| 4,844,273 | 7/1989 | Hawkins | |
| 4,846,376 | 7/1989 | Palmer | |
| 4,865,211 | 9/1989 | Hollingsworth | |
| 4,873,100 | 10/1989 | Dirksing et al. | |
| 4,875,576 | 10/1989 | Torgrimson et al. | |
| 4,892,126 | 1/1990 | Bucheler et al. | |
| 4,925,055 | 5/1990 | Robbins, III et al. | |
| 4,930,644 | 6/1990 | Robbins, III | 215/900 X |
| 4,955,493 | 9/1990 | Touzani | |
| 4,979,628 | 12/1990 | Robbins, III | |
| 5,087,406 | 2/1992 | Krall et al. | 215/398 X |
| 5,348,173 | 9/1994 | Norwood | 215/900 X |

COLLAPSIBLE URINE CONTAINER

RELATED APPLICATIONS

This application is a continuation-in-part of application Ser. No. 08/047,185, filed Apr. 16, 1993, now U.S. Pat. No. 5,417,337 which is a continuation-in-part of application Ser. No. 08/012,122 filed Feb. 1, 1993, now abandoned which, in turn, is a continuation-in-part of application Ser. No. 07/789,838 filed Nov. 12, 1991, and now U.S. Pat. No. 5,226,551.

TECHNICAL FIELD

This invention relates generally to urine containers and specifically, to a unique collapsible urine container construction which allows the container to be moved to a compact, collapsed condition for storage before and after use.

BACKGROUND

This invention relates to reusable and recollapsible containers, and particularly to a one-piece container construction having a peripheral side wall which is arranged to include at least three sections of differential wall thickness and diameter (or cross sectional area) to thereby permit movement of the container from an extended to a collapsed position by reason of a telescoping relationship between the various sections of the peripheral side wall. As such, this application essentially incorporates the peripheral side wall constructions as disclosed in copending application Ser. No. 08/047,185 filed Apr. 16, 1993, and in the '551 patent, the entirety of which are incorporated herein by reference. In this continuation-in-part application, the collapsible side wall constructions as disclosed in the above identified parent applications, are incorporated within a specialized urine container construction.

Collapsible containers are, of course, well known. For example, in applicant's own prior U.S. Pat. No. 4,930,644, a collapsible, thin film plastic container is disclosed wherein a major portion of the container side wall has a reduced wall thickness to permit random collapse of the side wall. In U.S. Pat. No. 4,865,211, a plastic bottle having a uniform wall thickness throughout the side wall, is configured to permit collapsing of the container through telescoping movement of one portion of the side wall into another portion of the side wall.

In U.S. Pat. No. 4,875,576, a container is disclosed wherein an intermediate portion of the side wall incorporates a bellows-type arrangement for facilitating collapse and extension of the container. The patent also discloses the use of helical creases which spiral or angle between first and second portions of the container side wall to facilitate collapsing action of the creased portion of the side wall.

In U.S. Pat. No. 4,873,100, a bi-stable, expandable plastic bottle is disclosed which incorporates a bellows-type side wall for movement between collapsed and extended positions.

In U.S. Pat. No. 2,880,902, a collapsible, drinking cup (or camera bellows) is disclosed wherein the side wall is composed of alternating thick and thin portions.

Various kinds of urine specimen containers/collectors are also well documented in the patent literature. For example, see U.S. Pat. Nos. 4,531,245; 4,270,231; 4,057,062; 3,727,244; 3,603,366; and 3,369,546.

DISCLOSURE OF THE INVENTION

The present invention incorporates a number of features not previously found in prior art related to urine containers and/or collectors which result in a simple, easy to use and low cost container which may be used, sterilized and re-used as desired, and which may be stored in a collapsed condition, thereby maximizing storage space. At the same time, by significantly reducing the thickness of portions of the container side wall, source reductions in the amount of plastic required to manufacture the containers are also realized.

More specifically, the invention provides in each of the variously disclosed embodiments, a one-piece extruded and blow molded (or otherwise suitably formed) container body formed with the peripheral side wall divided into upper, intermediate and lower concentric portions, with the lower and upper concentric portions having significantly greater wall thicknesses than the intermediate concentric portion. For example, the intermediate concentric portion may have a wall thickness of between about 2 and about 12 mils, and preferably about 8 mils, which permits the intermediate concentric portion to reverse fold as the upper and lower concentric portions, which may each have a wall thickness in the range of about 25 to 60 mils and preferably about 45 mils, are moved toward one another in the aforementioned telescoping relationship. Each container is also provided with an additional peripheral side wall portion extending upwardly at an angle from the upper concentric side wall portion. This inclined peripheral side wall portion has a cross sectional wall thickness which is similar to the intermediate concentric wall portion in one embodiment, i.e., about 2 to about 12 mils, and substantially the same as the upper concentric portion, i.e., between about 25 to about 60 mils in other embodiments. The uppermost edge of the upper inclined side wall portion is formed in all cases with a relatively rigid annular rim adapted to receive a conventional screw-on or snap-on type container cap. In the embodiment where the upper inclined side wall portion is relatively thin, it may be collapsed into the upper concentric side wall portion. In those embodiments, however, where the upper inclined side wall portion is relatively thick, the upper inclined side wall portion and the upper concentric side wall portion essentially form a relatively rigid unit and, of course, the inclined side wall portion is not collapsible into the upper concentric portion.

It is also a feature of the invention that the concentric peripheral side wall portions in all of the embodiments include annular surface configurations which facilitate the axial collapse and extension of the container. More specifically, at the interface between the variously mentioned peripheral side wall portions, the changes in wall thickness provide annular steps which, in effect, provide creases which facilitate the folding or collapsing action. In addition, in one embodiment, the intermediate peripheral concentric side wall portion is formed with an inwardly and downwardly tapered profile, i.e., a decreasing diameter in the downward direction, while the lower peripheral side wall portion is formed with a downwardly and outwardly tapered profile, i.e., an increasing diameter in the downward direction. The collapsing action is especially facilitated in this embodiment by reason of the fact that the maximum and minimum diameters of the tapered intermediate concentric side wall portion create a radial clearance between the lower edge of the upper concentric side wall portion and the upper edge of the lower concentric side wall portion, so that there is minimal frictional engagement between the upper intermediate and lower concentric wall portions during collapsing and extending movements.

Another feature in each of the disclosed embodiments relates to the provision for a gripping area at the lower end of the lower concentric side wall portion, particularly designed to facilitate the extension of the container from the collapsed position.

The variously disclosed embodiments in accordance with this continuation-in-part application also include integral handles fixed to the thicker side wall portions of the container.

Accordingly, in its broader aspects, the invention relates to a reusable, collapsed container comprising a bottom wall and a peripheral side wall movable between extended and collapsed positions, the side wall in the extended position having upper, lower and intermediate concentric portions and an uppermost inclined portion terminating at an open end, and wherein in the collapsed position, the lower side wall portion is partially telescoped into the upper side wall portion, with the intermediate side wall portion reverse folded therebetween.

In another aspect, the invention relates to a reusable collapsible urine collection container comprising a bottom wall and a relatively flexible, peripheral side wall extending upwardly from the bottom wall, the peripheral side wall including upper, intermediate and lower concentric portions and an uppermost inclined portion extending upwardly and angularly and from the upper concentric portion, the intermediate concentric portion having wall thickness less than the upper and lower concentric portions, the peripheral side wall movable between axially extended and collapsed positions, the uppermost inclined portion formed with an annular rim defining an upper open end of the container, the rim formed with means for receiving a removable cap; and wherein the intermediate concentric side wall portion is tapered downwardly radially inwardly, and the lower concentric side wall portion is tapered downwardly radially outwardly substantially to the bottom wall, such that in the collapsed position, the lower concentric side wall portion is partially telescoped within the upper concentric side wall portion with the intermediate concentric portion reverse folded therebetween.

Additional objects and advantages of the invention will become apparent from the detailed description below.

BEST MODE FOR CARRYING OUT THE INVENTION

Figure 1:
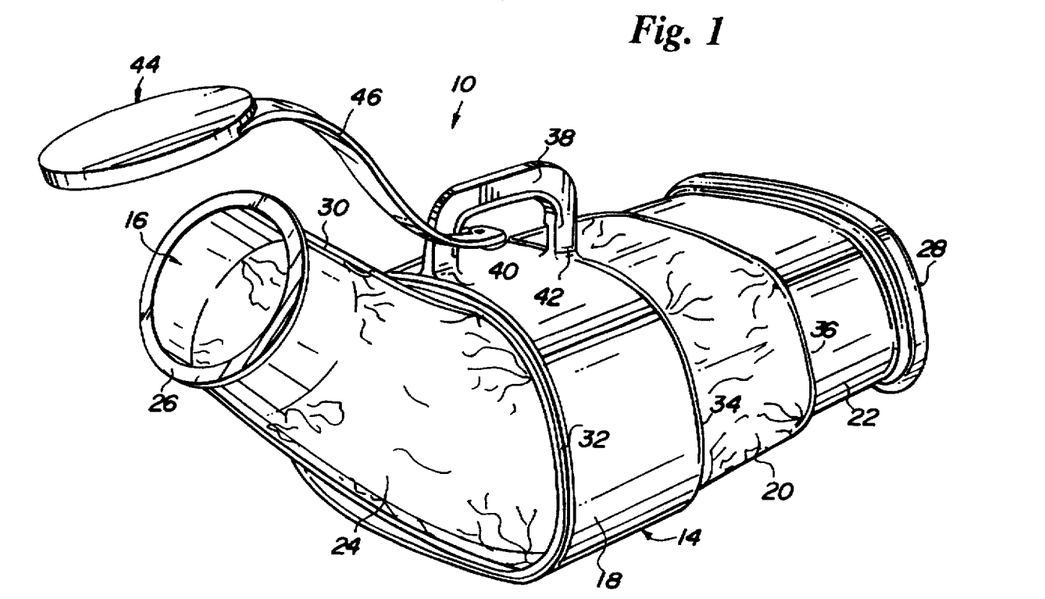
FIG. 1 is a perspective view of a urine container in accordance with a first embodiment of the invention.
Figure 2:
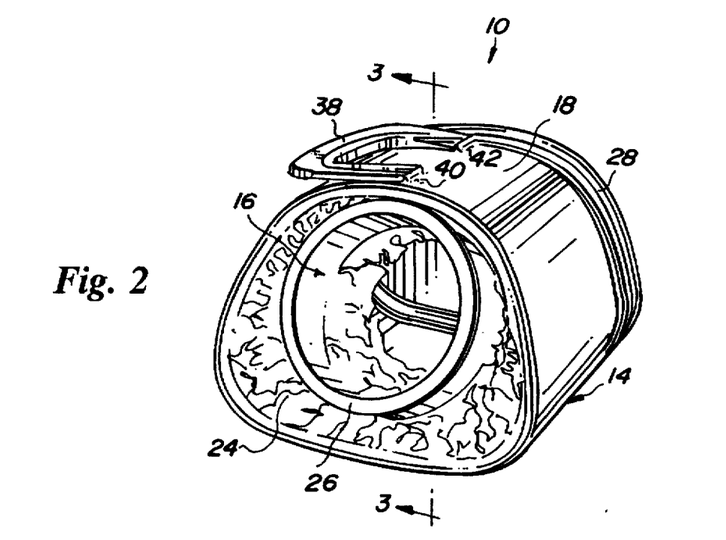
FIG. 2 is a perspective view of the container illustrated in FIG. 1 but in a collapsed condition.
Figure 3:
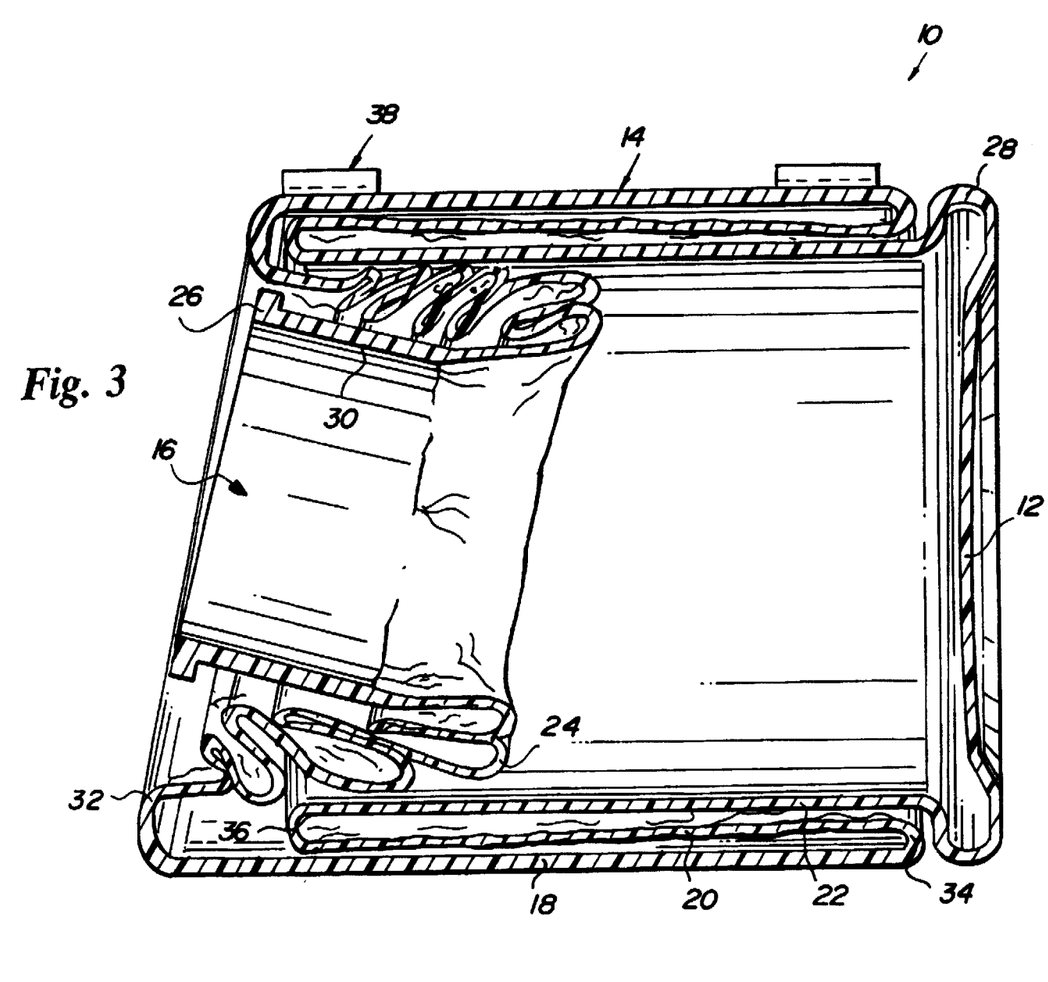
FIG. 3 is a side section view of the container illustrated in FIG. 2.

With reference now to FIGS. 1–3, a container 10 in accordance with a first embodiment of the invention generally includes a bottom wall 12 and a peripheral side wall 14 extending generally upwardly from the bottom wall 12, terminating at an opening 16. The container may be made of low density polyethylene (LDPE), polypropylene or other suitable plastic material. The container is preferably extrusion/blow molded but may be formed by other suitable plastic forming techniques as well.

The peripheral side wall 14 in this exemplary embodiment is formed to include three concentric side wall portions including an upper concentric portion 18, an intermediate concentric portion 20 and a lower concentric portion 22. These concentric side walls portions have generally similar axial lengths.

An exemplary thickness for concentric side wall portions 13 and 22 may be, for example, in a range of about 25 to 60 mils and preferably about 45 mils. The bottom wall 12 may be substantially thicker if desired. The intermediate concentric side wall portion 20 may have a thickness between about 2 and about 12 mils and preferably about 8 mils. In any event, the ratio between the thickness of each of the upper and lower concentric portions to the thickness of the intermediate concentric portion should be at least 3.75 to 1 and preferably about 5 to 1. These ratios are significant in that the absolute thickness values may change depending on container diameter, axial length and hence, volumetric capacity.

The container 10 in accordance with this continuation-in-part application also includes an uppermost peripheral side wall portion 24 which extends upwardly at an angle relative to the upper concentric side wall portion 18, i.e., side wall portion 24 is not concentric with side wall portions 18, 20 and 22. In accordance with this first embodiment, the upper inclined portion 24 has a relatively thin cross sectional thickness, similar to the intermediate concentric portion 20 described hereinabove. It will be appreciated from FIGS. 1–3 that the inclined or non-concentric portion 24 of the peripheral side wall 14 changes cross-sectional shape from the rounded trapezoidal shape of concentric portions 18, 20 and 22, to a circular shape at the rim 26 surrounding the opening 16. A radially outward, hollow flange or rim 28 at the container bottom, and the upper annular rim 26, may be constructed in relatively rigid form, with increased thickness (at the upper end of the 25 to 60 mils range or greater) necessary to support the container on the one hand, and to provide support for a conventional cap on the other hand. The increased thickness at rim 26 can be carried into the inclined or non-concentric portion 24 of the side wall as shown at 30.

The four described side wall portions 18, 20, 22 and 24 are separated from adjacent side wall portions by transitional steps 32, 34 and 36 which may comprise radially inwardly directed tucks or indentations which result primarily from the changes in wall thickness at each interface between the adjacent side wall portions. These steps facilitate the controlled telescoping (and hence collapsing) action of the lower side wall portion 22 into the upper portion 18, as well as the reverse folding of the intermediate side wall portion 20 relative to the lower side wall portion 22, and the random collapse of the upper inclined non-concentric portion 24 into the upper concentric portion 18, as best seen in FIG. 2. "Random collapse" in this application is simply meant to indicate that there is no precise and repeatable collapsing pattern attributable to the upper inclined or non-concentric portion 24. The portion may collapse generally as shown in FIGS. 2 and 3.

The overall configuration of the peripheral side wall portions also contribute to the ease with which the container may be collapsed and extended. For example, in this first embodiment, the upper concentric side wall portion 18 is of a gently rounded trapezoidal shape with a substantially straight side wall portion. The intermediate concentric portion 20 and the lower concentric portion 22 have successively smaller cross-sectional areas such that, by applying axially compressive forces at the container ends, the lower concentric portion 22 will move upwardly toward the upper concentric portion 18 while causing the intermediate concentric portion 20 to reverse fold in a controlled manner, best seen in FIG. 3. At the same time, the uppermost inclined or non-concentric portion 24 will collapse randomly into the upper concentric portion as shown in FIGS. 2 and 3. When the intermediate concentric portion 20 is fully reversed with the lower concentric portion 22 telescoped into the upper concentric portion 18, there remains exposed the lower radial flange or rim 28 which provides a good grasping point for the user when it is desired to exert a pull on the container to re-expand the latter to the extended position illustrated in FIG. 1.

It will be appreciated from the above description that while the collapsing action between the three concentric side wall portions 18, 20 and 22 is controlled in an orderly and neat manner, this is not possible with respect to the upper inclined or non-concentric peripheral side wall portion 24 by reason of the incline relative to the remaining container portions. Thus, the random collapsing action is sufficient to permit the entire upwardly inclined or non-concentric portion 24 to be moved into the profile established by the upper concentric portion 18 as best seen in FIG. 3.

This first described embodiment also includes an integral handle 38 formed in the upper concentric side wall portion 18. Handle 38 may be joined to the side wall portion 18 by a pair of thinned, living hinges 40 and 42 which permit the handle to be folded over to one side as best seen in FIG. 3. This feature contributes to the compactness of the container particularly in the collapsed condition.

It is also a feature of this invention to provide a conventional snap-on (or other, e.g. a screw-on) cap 44 which may be secured to the handle 38 by means of a flexible plastic strap 46 or other suitable means. Cap 44 is adapted to snap onto the relatively rigid rim 26 in the conventional fashion.

Figure 4:
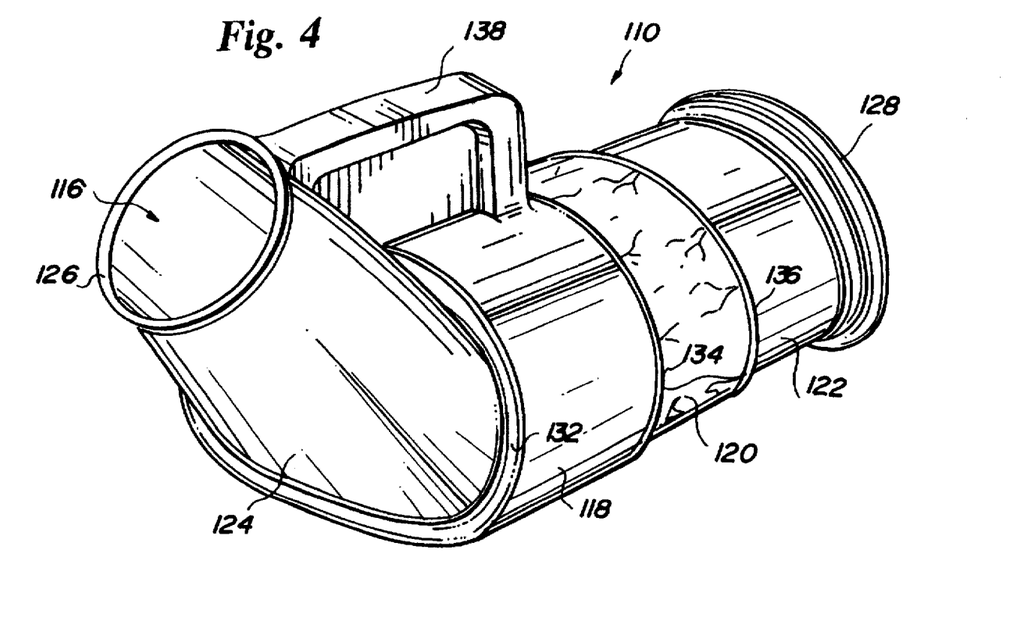
FIG. 4 is a perspective view of a urine container in accordance with a second embodiment of the invention.
Figure 5:
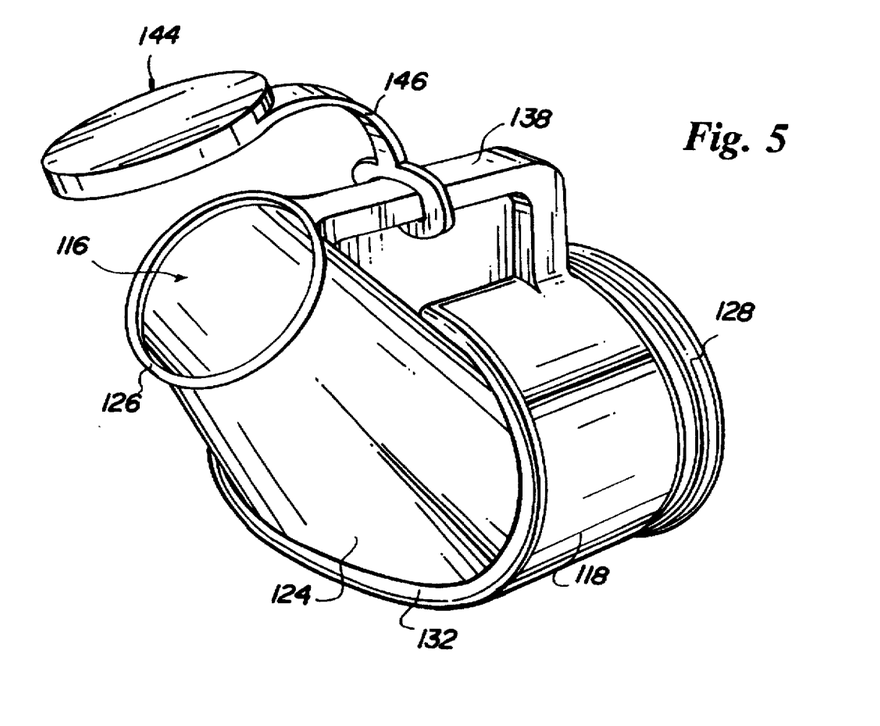
FIG. 5 is a perspective view of the container illustrated in FIG. 4 but in a collapsed condition.

Turning to FIGS. 4 and 5, a collapsible urine container 110 is illustrated in accordance with a second embodiment of the invention. For convenience, similar reference numerals are used as in the first described embodiment for corresponding elements, but with a prefix 1 added. In this second embodiment, the peripheral side wall portions 118, 120 and 122 are essentially identical to the corresponding side wall portions 18, 20 and 22 in the first described embodiment (but have a more rounded or oval cross-sectional shape) and therefore, the construction of these portions of the peripheral side all and the manner in which the lower side wall portion 122 collapses into the upper concentric side wall portion 118, with the intermediate peripheral side wall portion 120 reverse folded therebetween, need not be described in detail.

In this second described embodiment, the significant difference is that the inclined or non-concentric upper side wall portion 124 has a side wall thickness essentially the same as that of the upper concentric side wall portion 118 (while nevertheless incorporating an annular shoulder or step 132). In other words, the side wall portions 118 and 124 are relatively rigid and, in the collapsed condition as best seen in FIG. 5, the only collapsing action occurs between the concentric side wall portions 118, 120 and 122 (aided by annular steps 134, 136), substantially as described hereinabove with respect to the embodiment illustrated in FIGS. 1–3.

The other significant difference is that the handle 138 is of thicker construction, and extends between a lower end of the upper concentric side wall portion 118 and the uppermost end of the upper inclined or non-concentric side wall portion 124, adjacent the container opening 130. FIG. 5 also shows a snap-on cap 144 optionally secured to the handle 138 by means of a plastic strap 146.

Figures 6, 7:
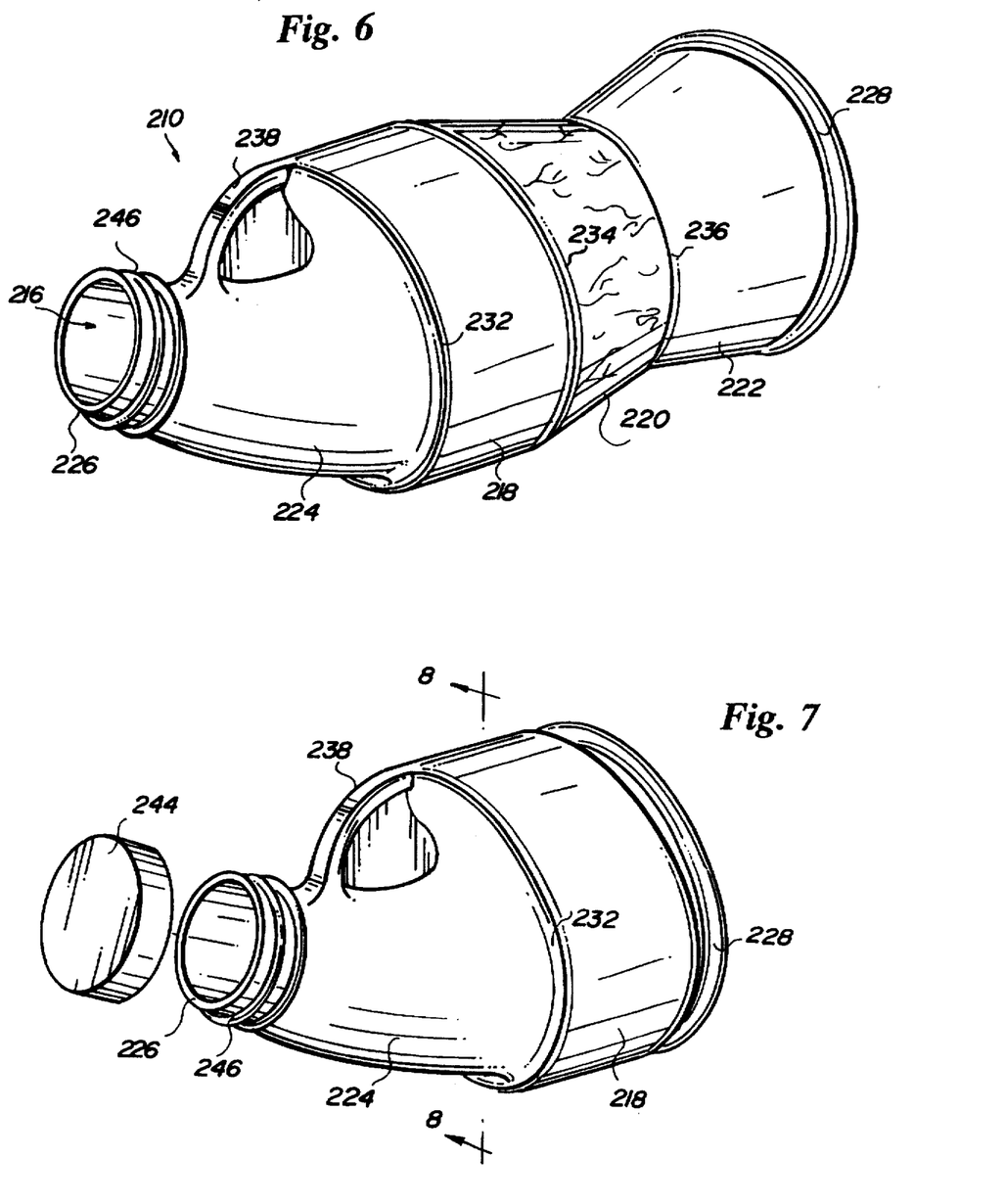
FIG. 6 is a perspective view of a urine container in accordance with a third embodiment of the invention.
FIG. 7 is a perspective view of the container illustrated in FIG. 5 but in the collapsed condition.
Figure 8:
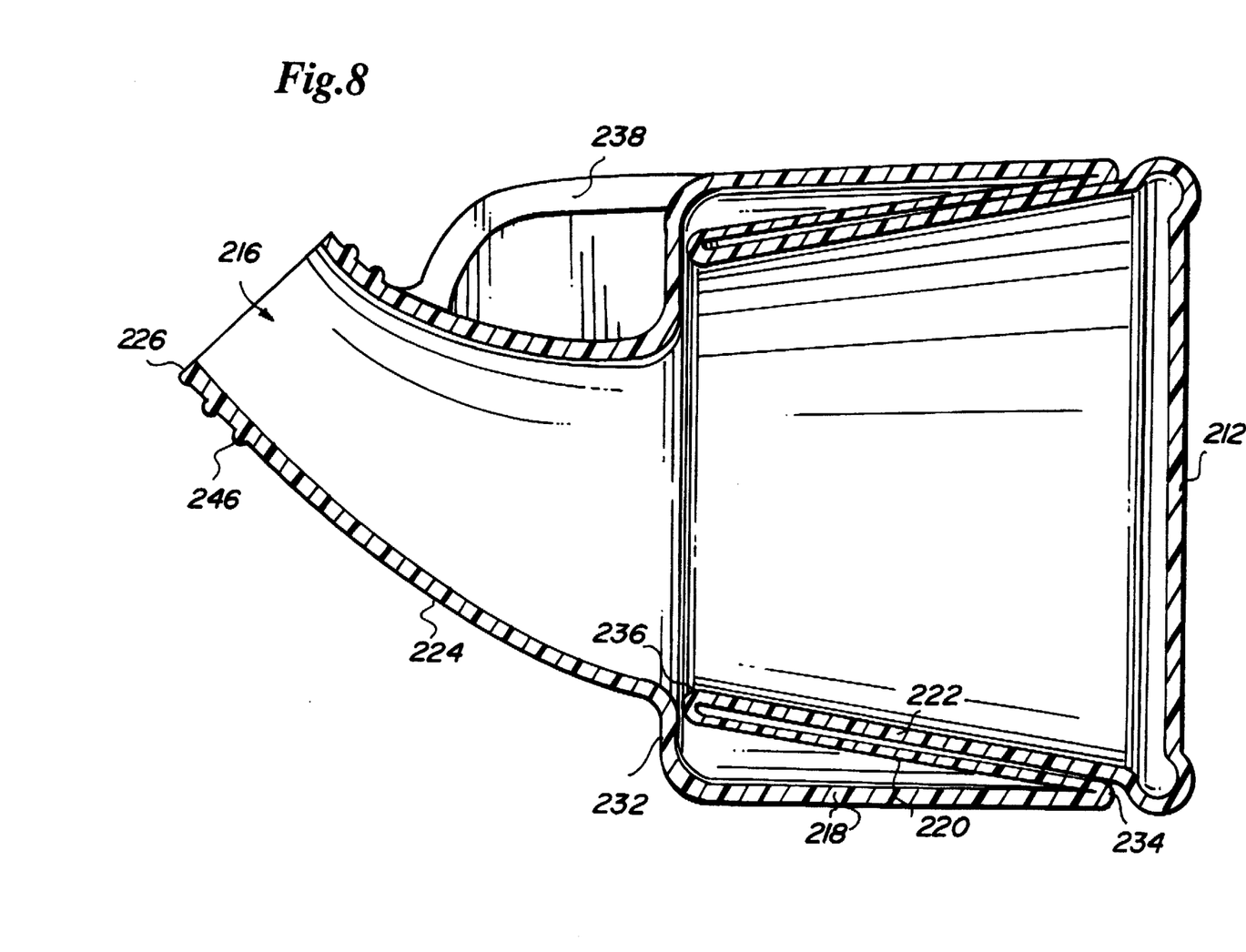
FIG. 8 is a side section view of the container illustrated in FIG. 7.

Turning now to FIGS. 6–8, a third exemplary embodiment of the invention is described and, here again, reference numerals similar to those used above are used here to designate the common components of the container 210, but with the prefix 2 added. Again, the construction of the concentric peripheral side wall portions 218, 220 and 222 is essentially the same as in the two above described embodiments, although the intermediate and lower concentric side wall portions 220 and 222 in this case are tapered in opposite directions, and all of the concentric side wall portions 218, 220 and 222 are essentially circular in cross section. The diameter of the upper concentric portion 218 is substantially uniform throughout its axial length. As in the second described embodiment, the upper concentric peripheral side wall portion 218 and the upper inclined portion 224 have similar wall thickness and essentially provide a relatively rigid integral unit. In this third embodiment, the upper inclined or non-concentric side wall portion 224 is somewhat curved as opposed to the angular inclination of the earlier described embodiments, and the upper end of the inclined or non-concentric side wall portion 224 is thickened to provide screw threads 246 adapted to receive a conventional screw cap 244. Another difference is the integral handle 238 which extends from the annular step or shoulder joining the upper inclined or non-concentric wall portion 224 to the upper concentric side wall portion 218.

It should be noted that a screw-on type cap and modified container rim configuration which is suitable for incorporation into the container/cap constructions disclosed herein is disclosed in commonly owned co-pending application Ser. No. 08/134,656 filed Oct. 12, 1993, incorporated herein by reference.

In addition, it should be noted here that the above described side wall configuration establishes a significant difference in diameters as between the upper side wall portion 218 and the uppermost end of the tapered lower side wall portion 222 (i.e., the smaller diameter of the lower side wall portion). This difference is determined by the degree of taper of the intermediate side wall portion 220 which, in turn, is determined by the maximum and minimum diameters of that portion of the side wall. This configuration even further facilitates the collapsing and extending movements by minimizing sliding friction between the concentric side wall portions 218, 220 and 222.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A reusable, collapsible urine container comprising:

a bottom wall and a relatively flexible, peripheral side wall extending upwardly from said bottom wall, said peripheral side wall including upper, intermediate and lower concentric portions and an uppermost non-concentric portion extending upwardly and angularly from said upper concentric portion, said intermediate concentric portion having a wall thickness less than said upper and lower concentric portions, said peripheral side wall movable between axially extended and collapsed positions, such that in said collapsed position, said lower concentric side wall portion is partially telescoped within said upper concentric side wall portion with said intermediate concentric portion reverse folded therebetween; said uppermost non-concentric portion formed with an annular rim defining an upper open end of the container, said rim formed with means for receiving a removable cap; and a handle integrally formed in said peripheral side wall; and wherein said intermediate concentric portion is tapered downwardly radially inwardly, and said lower concentric portion is tapered downwardly radially outwardly substantially to said bottom wall.

2. The container of claim 1 wherein, in the collapsed position, an uppermost edge of said lower side wall portion is radially spaced away from said upper side wall portion.

3. The container of claim 1 wherein part of said lower concentric side wall portion remains exposed when the container is in the collapsed position to thereby provide a gripping area.

4. The container of claim 1 wherein said peripheral side wall is circular in cross section and wherein said upper concentric side wall portion has a substantially uniform diameter throughout its axial length.

5. The container of claim 1 wherein said uppermost non-concentric portion and said upper concentric portion have substantially identical wall thicknesses.

6. The container of claim 5 wherein said handle extends between said uppermost non-concentric portion and said upper concentric portion.

7. The container of claim 1 wherein said container is constructed of one of LDPE or polypropylene.

8. The container of claim 1 wherein said upper concentric portion has a wall thickness of between about 25 and 60 mils, and said intermediate concentric portion has a wall thickness of between about 2 and 12 mils.

9. The container of claim 1 wherein a ratio of upper and lower concentric portion wall thickness to intermediate concentric side wall portion wall thickness is at least 3.75 to 1.

10. A reusable, collapsed container comprising:
 a bottom wall and a peripheral side wall movable between extended and collapsed positions, said side wall in the extended position having upper, lower and intermediate concentric portions and an uppermost non-concentric portion terminating at an open end, and wherein in the collapsed position, said lower side wall portion is partially telescoped into said upper side wall portion, with said intermediate side wall portion reverse folded therebetween; and wherein said intermediate concentric portion is tapered radially inwardly and downwardly and said lower concentric portion tapers radially outwardly and downwardly substantially to said bottom wall, an end of said lower concentric portion formed with a radial rim to thereby provide a gripping surface.

11. The collapsed container of claim 10 wherein said upper concentric portion is substantially cylindrical and of substantially uniform diameter.

12. The collapsed container of claim 10 wherein said container is constructed of one of LDPE or polypropylene.

13. The collapsed container of claim 10 wherein said upper and lower concentric portions and said uppermost non-concentric portion each have a wall thickness of between about 25 and 60 mils, and said intermediate concentric side wall portion has a wall thickness of between about 2 and 12 mils.

14. The collapsed container of claim 13 wherein said upper and lower concentric portions and said uppermost non-concentric portion have a wall thickness of about 45 mils, and said intermediate concentric side wall portion has a wall thickness of about 8 mils.

15. The container of claim 10 and including an integral handle extending between said uppermost portion and said upper concentric portion.

16. The container of claim 10 and including a removable cap.

* * * * *